United States Patent [19]

Dugan et al.

[11] Patent Number: 4,994,317

[45] Date of Patent: Feb. 19, 1991

[54] FLAME DURABLE FIRE BARRIER FABRIC

[75] Inventors: Jeffrey S. Dugan, Charlotte, N.C.; Thomas W. Tolbert, Fort Mill; James E. Hendrix, Spartanburg, both of S.C.

[73] Assignee: Springs Industries, Inc., Fort Mill, S.C.

[21] Appl. No.: 287,385

[22] Filed: Dec. 21, 1988

[51] Int. Cl.[5] .............................................. B32B 7/00

[52] U.S. Cl. .................................... 428/246; 428/251; 428/253; 428/254; 428/263; 428/266; 428/283; 428/284; 428/285; 428/402; 428/405; 428/447; 428/448; 428/450; 428/920; 428/921

[58] Field of Search ............... 428/246, 251, 253, 263, 428/266, 447, 448, 450, 402, 407, 284, 285, 283, 405, 920, 921

[56] References Cited

U.S. PATENT DOCUMENTS

| | | | |
|---|---|---|---|
| 3,574,108 | 4/1971 | Lewis | 161/113 |
| 3,577,306 | 5/1971 | Baker et al. | 161/90 |
| 3,894,169 | 7/1975 | Miller | 428/425 |
| 4,029,836 | 6/1977 | Wieczorek | 428/246 |
| 4,101,698 | 7/1978 | Dunning et al. | 428/31 |
| 4,190,131 | 2/1980 | Robinson | 181/296 |
| 4,211,261 | 7/1980 | Mehta et al. | 139/425.12 |
| 4,223,069 | 9/1980 | Berghmans | 428/324 |
| 4,273,691 | 6/1981 | MacLaury et al. | 260/235 |
| 4,315,971 | 2/1982 | Taylor et al. | 428/419 |
| 4,387,176 | 6/1983 | Frye | 428/921 |
| 4,542,067 | 9/1985 | Yamamoto et al. | 428/237 |
| 4,572,862 | 2/1986 | Ellis | 428/245 |
| 4,612,239 | 9/1986 | Dimanshteyn | 428/246 |
| 4,666,762 | 5/1987 | Yamamoto | 428/216 |

*Primary Examiner*—James J. Bell

*Attorney, Agent, or Firm*—Bell, Seltzer, Park & Gibson

[57] ABSTRACT

A fabric suitable for use as a flame barrier fabric comprising a flame durable textile fabric substrate, a flexible silicone polymer layer which stays intact, maintains its integrity on exposure to a flame and is carried by the surface of the textile fabric substrate, and a reflective flame durable paint coating carried by the silicone polymer coating.

25 Claims, 2 Drawing Sheets

FLAME DURABLE FIRE BARRIER FABRIC

FIELD OF THE INVENTION

This invention relates to a protective fabric suitable for use as a heat and flame barrier. More particularly, the fabric can be used as a decorative fire-resistant fabric or used to prevent the combustion of flammable materials by placing the fabric between the heat source and any flammable materials.

Various types of protective fabrics have been developed for use in applications in which a textile fabric (e.g., fire-fighting suits) or fabric covered articles (e.g., upholstered articles) must be capable of withstanding exposure to heat and/or flame without combustion. For example, in upholstered aircraft seating, a heat resistant protective barrier fabric is typically provided between the outer upholstery fabric and the underlying foam cushion to retard or prevent combustion of the cushion in the event of fire. U.S. Pat. No. 4,500,593 discloses an exemplary fire-resistant fabric comprising a silica core fiber wrapped with heat resistant fibers which is woven into a fabric and then laminated with aluminum foil. This fabric is resistant to fire but has limited flexibility and drapability, is noisy when flexed because of the foil, and is bulky and heavy.

U.S. Pat. No. 4,645,704 discloses a heat reflective fabric formed of a woven fabric coated with a thermoplastic resin which is then coated with a metallized layer applied by vapor deposition. The fabric can be used as an insulating fabric but has limited utility as a fire barrier fabric because the polymer coating carrying the metallized layer tends to burn or melt at relatively low temperatures, permitting the ignition of any underlying flammable materials.

Other techniques which apply a metallized layer to a fabric have limited usefulness as flame barriers because the metallized layer is often discontinuous across the entire area of the fabric, which leaves spaces between the fibers of the fabric. These spaces allow hot gases to penetrate therethrough and ignite the underlying flammable material. Moreover, the metallized layers are typically applied to the exposed surface of the fabric, thus reducing the decorative appearance of the fabric.

SUMMARY OF THE INVENTION

The present invention provides a flame durable fire barrier fabric which is resistant to high temperature fires, is lightweight, maintains excellent fabric characteristics, namely good drapability, tailorability and aesthetic properties, and eliminates the above-noted problems of the prior art. The fabric includes a flame durable textile fabric substrate, a flexible silicone polymer layer carried by the surface of the textile fabric substrate and a reflective paint coating carried by the silicone polymer layer. The silicone polymer layer fabric is substantially continuous, filling the interstices between the fibers and is resistant to melting or burning. The reflective paint coating is a heat barrier which can withstand high temperature. The coating does not, however, adversely affect flexibility and is quiet when creased. The fabric can be used either as the exterior fabric or as an underlying barrier fabric in various applications where heat and flame protective properties are required.

BRIEF DESCRIPTION OF THE DRAWINGS

Some of the features and advantages of the invention having been stated, others will appear as the description proceeds, when considered in conjunction with the accompanying drawings, in which.

DETAILED DESCRIPTION OF THE INVENTION

The present invention will be described more fully hereinafter with reference to the accompanying drawings, in which preferred embodiments of the invention are shown. This invention can, however, be embodied in many different forms and should not be construed as limited to the embodiment set forth herein; rather, applicants provide these embodiments so that this disclosure will be thorough and complete, and will fully convey the scope of the invention to those skilled in the art.

The textile fabric substrate must be flame durable so that at least some portion of the fabric will remain intact upon exposure to flame to form a base or support for the coating layers. The substrate may be of any of the various fabric constructions, such as fabrics of woven, nonwoven, knitted, braided, warp lay and scrim reinforced web construction. The yarns of these fabrics may be spun yarns, continuous filament yarns or of core spun construction. Exemplary yarns may comprise natural fibers such as jute, cotton, flax, wool, silk and the like; synthetic polymer fibers such as nylon, polypropylene, polyethylene, polyester, polyarene and polybenzimidazole; inorganic fibers such as glass or carbon; or metal fibers such as steel. Yarns having a core spun construction may for example include a core strand such as fiberglass filament or staple and a sheath of textile fibers such as cotton, rayon or polyester.

Many of the fabric constructions listed above, such as those using yarns containing polybenzimidazole, glass, metal, or carbon have flame durable characteristics. If the fabric construction, however, contains non-flame durable fibers or filaments, it may be rendered sufficiently flame durable by incorporating flame durable components with the fabric construction, such as by blending or intermingling non-flame durable fibers with flame durable fibers or by incorporating flame durable strands with the weave or knit construction. Exemplary flame durable components suitable for this purpose include fibers or filaments of polybenzimidazoles, polyimides, polyarenes, glass, stainless steel, copper, nickel, Kevlar®, Nomex® and carbon or carbonizable compositions.

Figure 1:
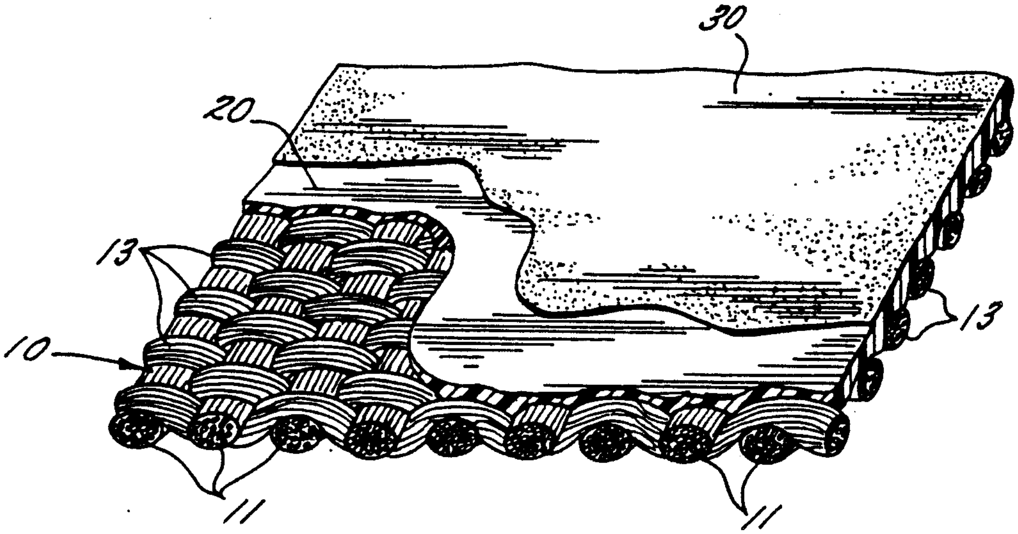
FIG. 1 is an enlarged detailed isometric view of a portion of a woven fire-resistant fabric in accordance with the invention, with the layers broken away to more clearly reveal the fabric construction.
Figure 2:
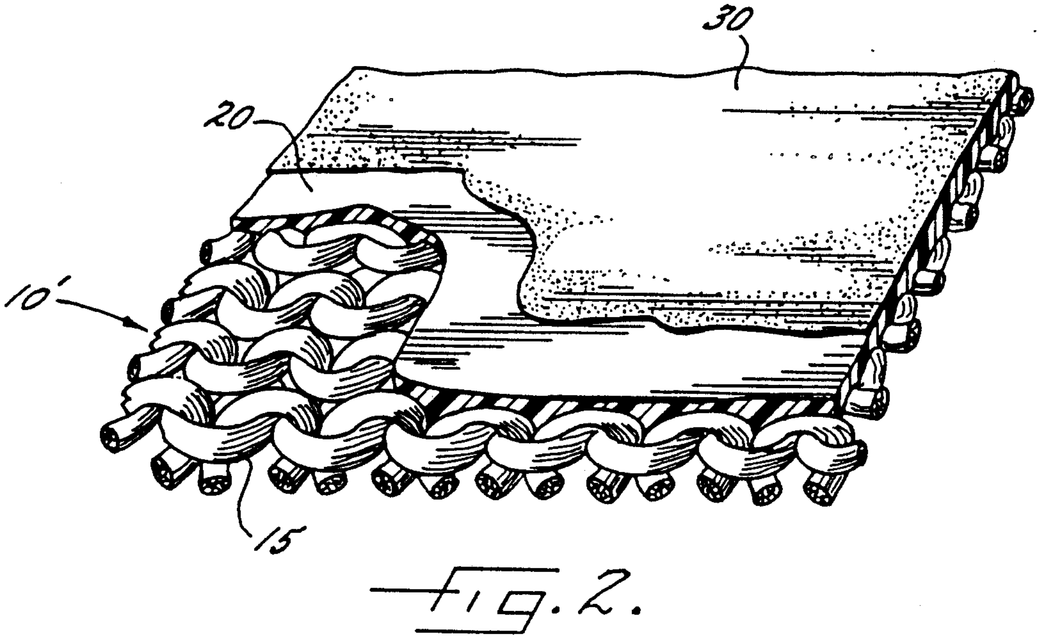
FIG. 2 is an enlarged detailed isometric view similar to FIG. 1 showing a knitted fire-resistant fabric.

Referring to FIG. 1, a particular textile fabric substrate having a woven construction is illustrated. The woven textile fabric substrate 10 is formed by warp yarns 11 interengaged with weft yarns 13 at spaced intervals and is woven by conventional techniques. FIG. 2 illustrates a textile fabric substrate 10' having a knitted construction. The knitted construction is characterized by the intermeshing of loops 15 of yarn and is possible using only a single set of yarns. The set may consist of a single yarn (i.e. weft knit) or a single group of yarns (i.e. warp knit). As shown in FIG. 2, the loops 15 of yarn are formed by single weft thread and are formed across the width of fabric. These constructions can be used as a decorative face fabric or be used as a barrier between a flammable fabric and a flammable material, e.g., between an outer upholstery face layer and a flammable foam layer.

The fire-resistant fabric of this invention is produced by applying a flexible silicone polymer layer 20 to the flame durable textile fabric substrate 10 followed by applying a heat reflective paint coating 30 to the silicone polymer layer. Preferably, the silicone layer 20 is substantially continuous, filling the voids between the yarns of the fabric. However, for certain applications the silicone layer may be made porous to make the fabric silicone layer more breathable, especially when used in clothing or cushion applications. This can be achieved, for example, by printing the silicone polymer onto the fabric in a pattern of less than 100 percent area coverage or by other conventional techniques. The silicone layer 20 provides a flame durable surface for the reflective paint coating 30 so that the coating can effectively serve as a reflective heat barrier to protect the underlying flammable substrate or surface from heat. The continuous reflective coating 30 acts as a convective and radiant heat barrier, and in combination with the silicone layer 20 serves as a barrier to hot gases which could cause ignition.

The silicone layer is applied by conventional coating techniques such as a knife coater, a roll coater, spray coating, calendering, transfer coating or screen printing or is applied as a separate preformed layer by laminating or bonding to the fabric. The layer is applied at a rate of about 0.25 to 20 ounces (dry) per square yard, with a rate of from about 1.0 to 3.0 ounces per square yard being preferred. Suitable flexible silicone polymers include those that on exposure to a flame stay intact and maintain their integrity to provide a surface on which the paint coating remains after exposure to flame and also contributes to the flame barrier properties of the fabric. Certain silicone polymers such as polydimethylsiloxanes and arene-based silicones accomplish this by forming a silica crust or matrix on exposure to heat.

Silicon polymers are widely available, are suited for being applied by conventional coating techniques and can be compounded and cured, crosslinked, or foamed to form a strong chemically inert, thermally stable flexible layer. Specific examples of suitable silicones are available from Dow Corning Corporation of Midland, Mich. and General Electric Company of Waterford, N.Y. and are sold under the designations "Fire Stop Foam", "108 Emulsion", "X2-7408 Clear Silicone Coating", "1-2577 Conformal Coating", "3-5024" and "3-5025" silicone water-based elastomers, "Silastic 590, 591, 595, 598 and 599" liquid silicone rubbers ("LSR"), and "RTF 762" silicone rubber foam. These silicone polymers are durable, easy to apply, flexible and relatively lightweight, thus minimally affect the drapability and flexibility of the barrier fabric.

To provide enhanced resistance to flame and heat, conventional flame retardant powder fillers, such as alumina trihydrate, kaolin, gypsum and hydrated clay may be incorporated in the silicone layer, particularly when polydimethylsiloxanes are used. For example, the layer may suitably incorporate from about 10 to 50 percent and preferably from about 15 to 35 percent by weight of alumina trihydrate.

The reflective paint coating 30 is preferably a metallic paint and contains metal flake pigments and a flame-durable binder. A metal flake pigment with good leafing properties and good reflecting properties is preferred. Exemplary metal flake pigments having high reflectivity include aluminum, brass, copper, gold, nickel and silver. The flame-durable binder is preferably a silicone alkyd resin. This resin when exposed to a flame reacts in a manner so that the metal flakes of the pigment intimately bind to the silicone layer. If it is desirable to use water to adjust the viscosity of the paint coating, aqueous ammonia may be included to improve the compatibility of the binder with the water.

Suitable reflective metal paints include Pyromark 2500 and Pyromark 800 aluminum paint available from Tempil Division of Big Three Industries, Inc. of South Plainfield, New Jersey and Lo-Mit-1 aluminum paint available from Solar Energy Corporation of Princeton, N.J. The reflective metal paint coating 30 has the advantage of being considerably less expensive than vacuum metallized coatings and overcomes the problem of the adherence of vacuum metallized coatings to a silicone layer. The paint coating 30 is applied by conventional techniques and may be dried at high temperatures and long exposure to improve adherence of the paint coating to the silicone layer. Typically about 300° F for 60 seconds is optimum to adhere the paint coating to the silicone layer to ensure maximum abrasion resistance.

The textile fabric is useful both as a decorative fire-resistant fabric and as a flame barrier. The fabric is drapable, tailorable and can easily be molded and formed so as to be capable of conforming over or around sharp corners, and thus making the fabric especially well suited for use in upholstered articles and as a carpet substrate. The coated side of fabric can be placed away from the flame source permitting the decorative exposed surface of the fabric layer to be unaltered and maintain its aesthetic appeal. The fabric is sewable and thus can be used in articles of clothing. Additionally, because the thin silicone layer of the present invention is lightweight, flexible and is substantially impervious to flame and water it is particularly suitable for use in making lightweight flame-retardant fire-fighting suits.

Figure 3:
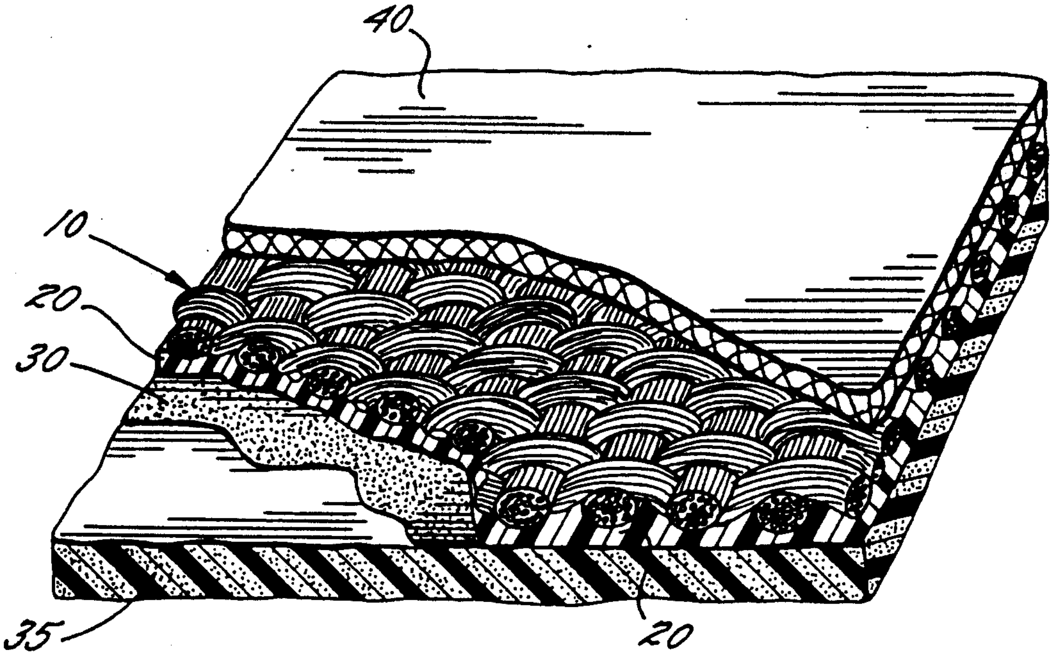
FIG. 3 is an enlarged detailed isometric view of the fire-resistant fabric shown in FIG. 1, located between an upholstery fabric outer layer and a foam substrate.

The fabric also is used as a fire barrier to retard or prevent combustion of flammable substrates such as wood, plastic laminates and polymer foam. The fabric shown in FIG. 3 is particularly effective as a barrier in upholstered products wherein the fabric 10 is placed between a flammable foam substrate 35 and the upholstery layer 40. Preferably the coated side of the barrier fabric 10 is placed away from the upholstery layer 40 and against the foam substrate 35, facing away from a flame source. The opposite orientation, however, with the coated side towards the upholstery layer 40 may be utilized. It also may be used as a barrier in building materials for offices, such as wall coverings, wall panels, office panel partitions, ceiling panels, floor coverings and the like.

Several coated fabrics are illustrated by the following examples which are to be considered as illustrative of the present invention. It should be understood, however, that the invention is not limited to the specific details of the examples.

EXAMPLES 1-7

Woven fabrics of glass yarn, cotton core-spun yarn and rayon core-spun yarn were formed using conventional techniques. After coating with the silicone layer and the reflective paint coating, a polyurethane foam pad was stapled thereto with the reflective layer against the foam. These fabrics were compared to a standard non-coated glass yarn fabric. The test method consisted of exposing the fabric/foam composite, foam side up and away from the flame, to a 1200° F bunsen burner flame for 2.5 minutes.

EXAMPLE 1

A woven glass fabric was coated with a 7.5 oz/sq yd silicone layer of Dow Corning Silastic 591 LSR and tested. The fabric had good strength and drapability, but showed only a slight improvement in flame barrier performance over the standard.

EXAMPLE 2

A glass fabric was coated with a reflective aluminum paint coating of Pyromark 2500 aluminum paint. The fabric had fair strength and drapability but the flame barrier performance was substantially poorer than the standard.

EXAMPLE 3

A glass fabric was coated with a 2.5 oz/sq yd silicone layer of Dow Corning Silastic 591 LSR as in Example 1 and with a reflective paint coating of Pyromark 800 aluminum paint. The fabric had good strength and drapability and the flame barrier performance was substantially better than the standard.

Examples 1-3 illustrate that it is not the silicone layer alone nor the reflective paint coating that provides the desired flame barrier performance properties; rather, it is the use of these together.

EXAMPLE 4

A glass fabric was coated with 2.5 oz/sq yd silicone layer of Dow Corning 108 silicone and with a nonreflective charcoal-colored paint coating of Pyromark 1200 non-aluminum paint which includes a flame durable binder. The fabric had fair strength and drapability but the fire resistance was substantially poorer than the standard. This demonstrates the importance of using a reflective paint.

EXAMPLE 5

A glass fabric was coated with 2.5 oz/sq yd of Dow Corning 3-5025 and with Lo-Mit-1 reflective aluminum paint. The fabric had good strength and fair drapability and the flame barrier performance was substantially better than the standard.

EXAMPLE 6

A rayon/glass core-spun woven twill fabric was coated with 2.5 oz/sq yd of Dow 3-5025 having 25 percent by weight alumina trihydrate and then coated with Lo-Mit-1 reflective aluminum paint. The fabric had good strength and fair drapability and the flame barrier performance was superior to that of the same fabric without the protective coatings.

EXAMPLE 7

A cotton/glass core-spun woven twill fabric was coated with a 2.5 oz/sq yd layer of Dow Corning 108 and Pyromark 800 reflective aluminum paint. The fabric had very little loss of drapability as compared to the uncoated fabric and the flame barrier performance was substantially better.

EXAMPLES 8-9

The specimens of Examples 5 and 6 were also tested using National Fire Protection Association test method NFPA #701 wherein a vertical sample was exposed to a small scale flame. The Example 5 specimen (not having any flame retardant filler) failed whereas the Example 6 specimen (having alumina trihydrate) passed.

EXAMPLE 10

The specimen of Example 6 was also tested using Federal Aeronautical Agency test method FAA FAR 25.853(c) wherein an upholstered airplane seat was exposed to a flame, and it passed.

As is readily apparent, a textile fabric produced according to the present invention results in one which has improved flame barrier performance properties while maintaining the physical properties thereof such as flexibility and drapability.

In the drawings and specification, there have been disclosed preferred embodiments of the invention and, although specific terms are employed, they are used in a generic and descriptive sense only and not for the purpose of limitation, the scope of the invention being set forth in the following claims.

That which is claimed is:

1. A fire-resistant fabric suitable for use as a flame barrier comprising a flame durable textile fabric substrate, a flexible silicone polymer layer which stays intact and maintains its integrity on exposure to a flame and which is carried by the surface of the textile fabric substrate, and a reflective flame durable paint coating carried by said silicone polymer layer.

2. A fire-resistant fabric according to claim 1 wherein said flame durable textile fabric substrate comprises a nonwoven blend of flame durable fibers and non-flame durable fibers.

3. A fire-resistant fabric according to claim 1 wherein the silicone layer includes from about 10 to 50 percent of alumina trihydrate.

4. A fire-resistant fabric according to claim 1 wherein the silicone layer is applied at a rate of from about 0.25 to 20 ounces per square yard.

5. A fire-resistant fabric according to claim 1 wherein the silicone layer forms a silica crust on exposure to a flame.

6. A fire-resistant fabric according to claim 5 wherein the silicone layer is selected from the group consisting of polydimethysiloxanes and arene-based silicones.

7. A fire-resistant fabric according to claim 1 wherein said reflective paint coating comprises a reflective metallic paint.

8. A fire-resistant fabric according to claim 7 wherein said reflective metallic paint comprises metal flake pigments and a flame durable silicone alkyd resin binder.

9. A fire-resistant fabric according to claim 8 wherein the metal flake pigments are selected from the group consisting of aluminum, brass, copper, gold, nickel and silver.

10. An article of wearing apparel comprising the fire-resistant fabric of claim 1.

11. An upholstered seating cushion comprising the fire-resistant fabric of claim 1.

12. An office building material comprising the fire-resistant fabric of claim 1.

13. A carpet substrate comprising the fire-resistant fabric of claim 1.

14. A fire-resistant fabric suitable for use as a flame barrier comprising a flame durable woven textile fabric substrate formed of interwoven warp and weft yarns, a flexible silicone polymer layer which stays intact, maintains its integrity on exposure to a flame and which is carried by the surface of said warp and weft yarns, substantially filling interstices between said yarns to form a continuous barrier, and a reflective metallic paint coating carried by said silicone polymer layer.

15. A fire-resistant fabric according to claim 14 wherein the yarns include a flame-durable component comprising a filament or fiber selected from the group consisting of polybenzimidazoles, polyimides, polyarenes, glass, stainless steel, copper, nickel, Kevlar ®, Nomex ®, carbon and carbonizable compositions.

16. A fire-resistant fabric suitable for use as a flame barrier comprising a flame durable knitted textile fabric substrate formed of intermeshed loops of yarn, a flexible polymer layer of polydimethylsiloxane or arenebased silicones carried by the surface of said loops of yarns and substantially filling interstices between said loops of yarns to form a continuous barrier, and a reflective metallic paint coating carried by said silicone polymer layer, the reflective portion thereof facing away from the exposed surface of said fabric substrate.

17. A fire-resistant fabric according to claim 16 wherein the yarns include a flame-durable component comprising a filament or fiber selected from the group consisting of polybenzimidazoles, polyimides, polyarenes, glass, stainless steel, copper, nickel, Kevlar ®, Nomex ®, carbon and carbonizable compositions.

18. A fire-resistant laminate comprising a foam layer, a flame barrier fabric overlying said foam layer, said flame barrier fabric comprising a textile fabric substrate formed of integrated textile yarns, a flexible silicone polymer layer which forms a silica crust on exposure to a flame and which is carried by the surface of the textile yarns, a reflective paint coating carried by the silicone polymer coating, and a surface fabric overlying said flame barrier fabric.

19. A fire-resistant laminate according to claim 18 wherein the reflective paint coating contacts the foam layer and the textile fabric substrate contacts the separate, surface decorative upholstered layer.

20. A fire-resistant laminate according to claim 18 wherein the foam layer comprises a polyurethane foam.

21. A fire-resistant laminate according to claim 18 wherein the silicone layer comprises a polydimethylsiloxane.

22. A fire-resistant laminate according to claim 18 wherein the silicone layer includes from about 15 to 35 percent of alumina trihydrate.

23. A fire-resistant fabric according to claim 18 wherein said reflective paint coating comprises a reflective metallic paint coating.

24. A fire-resistant laminate according to claim 23 wherein said reflective metallic paint coating comprises aluminum flake pigments and a flame durable silicone alkyd resin binder.

25. An upholstered seating cushion comprising the fire-resistant laminate of claim 19.

* * * * *

UNITED STATES PATENT AND TRADEMARK OFFICE
CERTIFICATE OF CORRECTION

PATENT NO. : 4,994,317

DATED : February 19, 1991

INVENTOR(S) : Jeffrey S. Dugan, Thomas W. Tolbert, James E. Hendrix

It is certified that error appears in the above-identified patent and that said Letters Patent is hereby corrected as shown below:

Column 8, line 1, "integrated" should be -- interengaged --.

Signed and Sealed this

Twenty-first Day of July, 1992

*Attest:*

DOUGLAS B. COMER

*Attesting Officer*

*Acting Commissioner of Patents and Trademarks*